(12) United States Patent
Kondo

(10) Patent No.: US 6,574,882 B1
(45) Date of Patent: Jun. 10, 2003

(54) PEN TYPE CURVE LENGTH MEASURING APPARATUS HAVING CASTER

(76) Inventor: Rie Kondo, 4-19-23, Higashiikuta, Tama-ku, Kawasaki-shi, Kanagawa-Prefecture (JP)

( * ) Notice: Subject to any disclaimer, the term of this patent is extended or adjusted under 35 U.S.C. 154(b) by 0 days.

(21) Appl. No.: 10/003,285

(22) Filed: Dec. 6, 2001

(51) Int. Cl.[7] ................................................. G01B 3/12
(52) U.S. Cl. .......................................... 33/773; 33/780
(58) Field of Search .......................... 33/772, 773, 779, 33/780, 781, 782, 1 PT

(56) References Cited

U.S. PATENT DOCUMENTS

| | | | | |
|---|---|---|---|---|
| 2,662,292 A | * | 12/1953 | Pickard | 33/781 |
| 3,121,956 A | * | 2/1964 | Philbin | 33/772 |
| 4,176,458 A | * | 12/1979 | Dunn | 33/781 |
| 4,577,411 A | * | 3/1986 | Martin | 33/778 |
| 4,719,449 A | * | 1/1988 | Cousseau | 33/1 PT |
| 5,027,296 A | * | 6/1991 | Yamaguchi et al. | 33/773 |
| 5,301,434 A | * | 4/1994 | Imaizumi | 33/1 PT |
| 5,477,622 A | * | 12/1995 | Skalnik | 33/781 |
| 5,943,785 A | * | 8/1999 | Kondo | 33/773 |
| 6,199,292 B1 | * | 3/2001 | Ebeling | 33/775 |
| 6,249,987 B1 | * | 6/2001 | Gorfu | 33/781 |

* cited by examiner

*Primary Examiner*—G. Bradley Bennett
(74) *Attorney, Agent, or Firm*—Smith, Gambrell & Russell, LLP

(57) ABSTRACT

A handy type curve length measuring apparatus comprises a pen-holder like body, a castor rotatably connected with the body so as to rotate around a first axis and having a disk including slits, pulse generating means and an indicator. When the disk rolls on a curved line, the slits provided on the disk move past a pulse generating means. Counting means count the number of pulses and the indicator displays the length of the curve based on the number of generated pulses. Since the apparatus can trace curved lines without rotating the body due to the castor mechanism, an accurate and easy measurement of length can be attained.

6 Claims, 2 Drawing Sheets

PEN TYPE CURVE LENGTH MEASURING APPARATUS HAVING CASTER

BACKGROUND OF THE INVENTION

1. Field of the Invention

The present invention relates to a curve length measuring apparatus and particularly to a pen-holder type curve length measuring apparatus having a castor mechanism so as to be able to trace an object curved line correctly and easily.

2. Prior Art

There are curve length measuring apparatus used for measuring the length of curves on maps, drawings and the like. Generally, these apparatuses are characterized in being used readily like drawing with a pencil. Therefore, most of the apparatuses have a simple construction typically comprising a pen-holder like body, a rolling disk provided at the tip of the body and an indicator mounted on the body. The rolling disk is for detecting the length of a curved or straight line by rolling the disk along the curve or the line. Since the axis of the rolling disk is rigidly connected with the body, while an operator traces a curve with the rolling disk, the operator has to continue to rotate the body in the tangential direction of the curve, so it is difficult to trace curves correctly whose direction changes in a complicated manner. Further, it is hard to read the indicator due to the ever rotating body. These difficulties lead to incorrect or erroneous measurement of curve length.

Moreover the cost of such apparatus could be reduced by applying convenient devices.

A caster type apparatus, having an electro-optical component, under utilized, because of short battery life, less shock stability and high cost, as caused by complicated and delicate optical structure of many optical devices.

SUMMARY OF THE INVENTION

Accordingly, it is an aim of the present invention to obviate the disadvantages of the prior art and it is an object of the present invention to provide a handy type curved length measuring apparatus capable of tracing curves correctly without rotating the body, i.e., with the body directed towards the operator so as to read the indicator easily, resulting in marketable apparatus.

In order to achieve the object, a curve length measuring apparatus of the present invention comprises: a castor rotatably connected with a body so as to rotate around a first axis of the castor, a rolling disk rotatably connected with castor so as to rotate around a second axis of the rolling disc; a marketable device so called photo interrupter assembled in the castor so as to generate electronic pulses; and an electronic coupling, e.g. a slip ring, forming part of the castor.

In one embodiment, the apparatus further comprises a plurality of slits provided on the rolling disk along the outer periphery thereof; light emitting means for emitting light and light detecting means for light detection installed in the photo interrupter, the light emitted from one side in the air gap of the photo interrupter to the other side where emitted light is directly converted to electricity; the photo interrupter generating electric pulses as the rolling disk rotates; and electric coupling comprising a bush and slip-ring conducting electric current from the body to the rotatable castor; and pulse counting means for indicating a curve length based on the number of pulses.

DETAILED DESCRIPTION OF THE INVENTION

Figure 1:
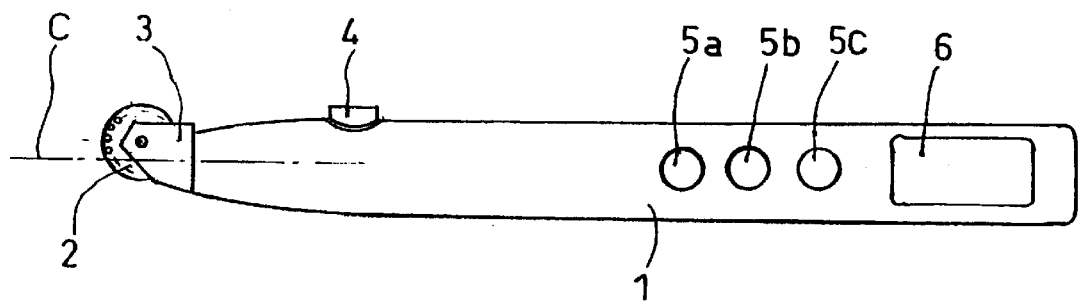
FIG. 1 is an overall view of a curve length measuring apparatus having a castor mechanism according to an embodiment of the present invention.

Referring now to FIG. 1, numeral 1 denotes a body having a pen-holder like configuration, numeral 3 denotes a castor rotatably connected with the tip (front end) of the body 1 so as to rotate around a center axis c thereof, numeral 2 denotes a rolling disk rotatably connected with the castor 3, numeral 4 denotes a power switch, numeral 5a, 5b, 5c denote control switches and numeral 6 is a liquid crystal display. The axis of the rolling disk 2 is connected with the castor 3 and is offset from the center axis c of the body 1 by a length approximately 2 to 4 millimeters.

Figure 2:
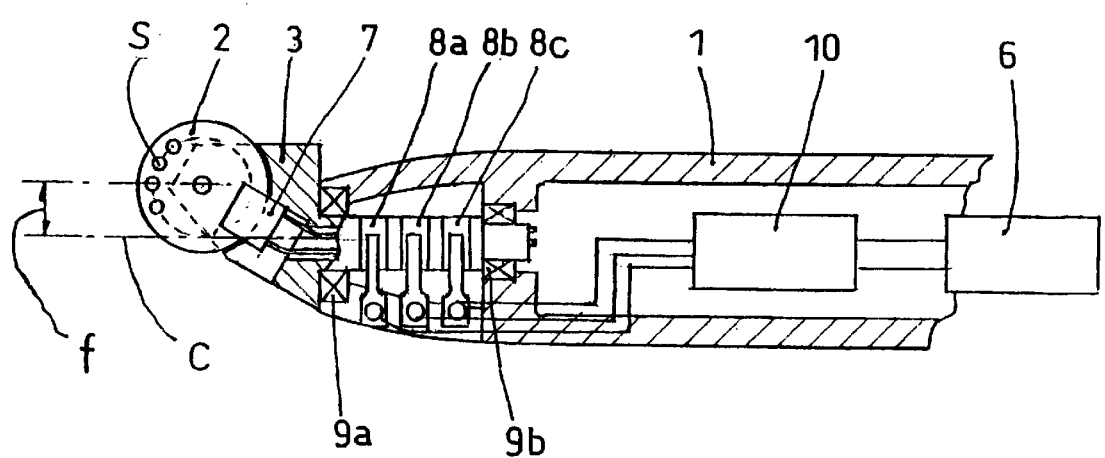
FIG. 2 is an enlarged sectional view showing a primary portion of a curve length measuring apparatus according to an embodiment of the present invention.

Referring to FIG. 2, numeral 7 denotes photo interrupter of cubic shape had dimensions 4 mm×4 mm×4 mm, numeral 8a, 8b, 8c denote slip-rings and accompanying brushes, numeral 9a, 9b denote bearings which rotatably fix the castor 3 to the body 1 and numeral 10 denotes a pulse counter.

The rolling disk 2 is made of a hard material such as bronze, iron and the like and has a plurality of slits s equally spaced around the outer periphery thereof. The distance between two adjacent slits is approximately equal to the width of the slit s. The diameter of the rolling disk 2 is preferably 7 to 13 millimeters and its thickness is around 0.5 to 0.8 millimeters.

Figure 3:
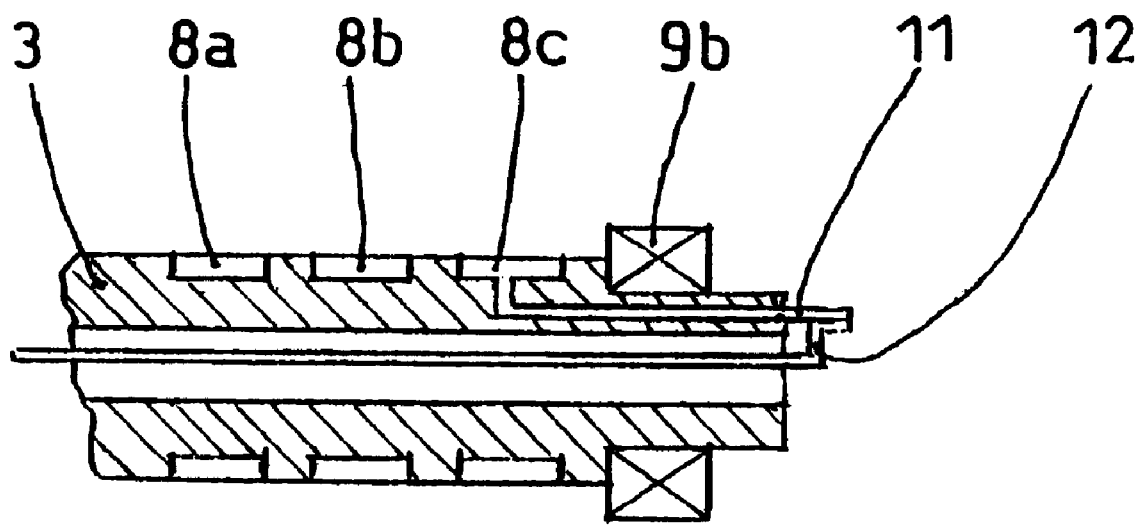
FIG. 3 is an enlarged sectional view showing a primary portion of an end portion of the castor body.

Referring to FIG. 3, numeral 3 denotes the end part of the castor body, numeral 8a, 8b, 8c denote slip-rings, numeral 11 denotes a lead wire connected with the slip-ring 8c, numeral 12 denotes a lead wire from the photo interrupter 7 coming through the center of the castor, the lead wire 11 and the lead wire 12 being soldered at the end of castor.

When the rolling disk 2 rotates, the slits s move and the light beam is shut off by the rolling disk 2 in the photo interrupter 7. When the rolling disk 2 rotates further, the slits s appear to pass the light beam. Thus, the rotation of the rolling disk 2 generates light pulses, then the photo interrupter 7 generates electronic pulses. That is to say, the number of pulses correlates to the travelling length of the rolling disk 2.

Electronic pulses pass through the slip-ring then arrive at the pulse counter 10. The number of pulse signals is counted in the counter 10 and indicated on the liquid crystal display 6. In this embodiment, one pulse corresponds to one millimeter in the traveling length of the rolling disk 2. Alternatively, it is possible to display other numbers, for example, a distance between two points on a map calculated in the counter 10 by an indication of the control switches 5a, 5b, 5c on a scale factor.

In summary, according to the present invention, since it is possible to trace curves without rotating the body of the curve length measuring apparatus in the traveling direction, an easy and fast measurement of curve length can be achieved. Further, the curve length measuring apparatus employs a photo interrupter and an electrical coupling means of slip-ring and brushes, whereby the construction becomes simple the therefore the battery life is practical, the shock stability is practical, and the cost of the apparatus can be greatly reduced.

What is claimed is:

1. A curve length measuring apparatus having a penholder shaped body and a curve tracing mechanism connected with said body for measuring a length of a curve by tracing said curve, comprising:

a castor rotatably connected with said body so as to rotate around a first axis of said body;

a rolling disk rotatably connected with said castor so as to rotate around a second axis of said rolling disk;

a plurality of slits provided on said rolling disk around the periphery thereof;

an electric pulse generating means for generating electric pulses and converting light pulses generated when said rolling disk rotates; and pulse counting means for counting the number of said pulses and curve length indicating means for indicating a curve length based on the number of said pulses.

2. A curve length measuring apparatus as claimed in claim 1, further comprising:

electric coupling means for coupling electric pulses generated in said castor and being rotatable with respect to said counting means fixed in said body.

3. A curve length measuring apparatus as claimed in claim 2, wherein the electric coupling means comprises one or more slip rings and one or more brushes.

4. A curve length measuring apparatus as claimed in claim 3, wherein the or each slip ring is connected to, and rotates with the castor.

5. A curve length measuring apparatus as claimed in claim 1, wherein said castor has a hollow interior space or groove through which a lead wire passes and can connect with another lead wire.

6. A curve length measuring apparatus as claimed in claim 1, wherein said pulse counting means comprises a photo interrupter.

* * * * *